US009251808B2

(12) United States Patent
Ikeda et al.

(10) Patent No.: US 9,251,808 B2
(45) Date of Patent: Feb. 2, 2016

(54) APPARATUS AND METHOD FOR CLUSTERING SPEAKERS, AND A NON-TRANSITORY COMPUTER READABLE MEDIUM THEREOF

(75) Inventors: Tomoo Ikeda, Tokyo (JP); Manabu Nagao, Kanagawa-ken (JP); Osamu Nishiyama, Kanagawa-ken (JP); Hirokazu Suzuki, Tokyo (JP); Koji Ueno, Kanagawa-ken (JP); Nobuhiro Shimogori, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

(21) Appl. No.: 13/412,694

(22) Filed: Mar. 6, 2012

(65) Prior Publication Data

US 2013/0030794 A1 Jan. 31, 2013

(30) Foreign Application Priority Data

Jul. 28, 2011 (JP) .................................. 2011-166071

(51) Int. Cl.
*G10L 15/06* (2013.01)
*G10L 21/028* (2013.01)
*G10L 15/26* (2006.01)

(52) U.S. Cl.
CPC ............... *G10L 21/028* (2013.01); *G10L 15/26* (2013.01)

(58) Field of Classification Search
CPC ....................................................... G10L 17/02
USPC ................................................. 704/245, 235
See application file for complete search history.

(56) References Cited

U.S. PATENT DOCUMENTS 8,452,596 B2 * 5/2013 Tani et al. ..................... 704/247
8,694,304 B2 * 4/2014 Larcheveque et al. ............ 704/9
2008/0215324 A1 * 9/2008 Hirohata ....................... 704/246
2008/0243506 A1 * 10/2008 Sakai et al. ................. 704/256.4
2009/0019026 A1 * 1/2009 Valdes-Perez et al. ........... 707/5
2011/0046958 A1 * 2/2011 Liu et al. ....................... 704/268
2011/0106523 A1 * 5/2011 Maeda et al. ..................... 704/2
2012/0209605 A1 * 8/2012 Hurvitz et al. ................ 704/235
2013/0006635 A1 * 1/2013 Aronowitz ..................... 704/245
2014/0129220 A1 * 5/2014 Zhang et al. .................. 704/235

FOREIGN PATENT DOCUMENTS

JP 2000-250593 9/2000
JP 2010-060850 3/2010

OTHER PUBLICATIONS

Akita, et al. Unsupervised Speaker Indexing of Discussions Using Anchor Models, Systems and Computers in Japan, vol. 36, Issue 9, pp. 1-107.

* cited by examiner

*Primary Examiner* — Jakieda Jackson
(74) *Attorney, Agent, or Firm* — Amin, Turocy & Watson, LLP

(57) ABSTRACT

According to one embodiment, a speaker clustering apparatus includes a clustering unit, an extraction unit, and an error detection unit. The clustering unit is configured to extract acoustic features for speakers from an acoustic signal, and to cluster utterances included in the acoustic signal into the speakers by using the acoustic features. The extraction unit is configured to acquire character strings representing contents of the utterances, and to extract linguistic features of the speakers by using the character strings. The error detection unit is configured to decide that, when one of the character strings does not fit with a linguistic feature of a speaker into which an utterance of the one is clustered, the utterance is erroneously clustered by the clustering unit.

6 Claims, 13 Drawing Sheets

| THE FIRST PERSON RULE ID | THE FIRST PERSON RULE |
|---|---|
| 1 | WATASHI |
| 2 | BOKU |
| 3 | ORE |

FIG. 3A

| THE END OF SENTENCE RULE ID | THE END OF SENTENCE RULE |
|---|---|
| 1 | DESU. , MASU. |
| 2 | DA. , DEARU. |

FIG. 3B

| UTTERANCE ID | START TIME (HOUR:MINUTE:SECOND) | COMPLETION TIME (HOUR:MINUTE:SECOND) |
|---|---|---|
| 1 | 00:00:00 | 00:00:02 |
| 2 | 00:00:03 | 00:00:06 |
| 3 | 00:00:10 | 00:00:15 |
| 4 | 00:00:18 | 00:00:25 |
| 5 | 00:00:30 | 00:00:35 |
| 6 | 00:00:36 | 00:00:40 |

FIG. 5

| SPEAKER ID | UTTERANCE ID | START TIME (HOUR:MINUTE:SECOND) | COMPLETION TIME (HOUR:MINUTE:SECOND) |
|---|---|---|---|
| 1 | 1 | 00:00:00 | 00:00:02 |
| 2 | 2 | 00:00:03 | 00:00:06 |
| 1 | 3 | 00:00:10 | 00:00:15 |
| 2 | 4 | 00:00:18 | 00:00:25 |
| 1 | 5 | 00:00:30 | 00:00:35 |
| 3 | 6 | 00:00:36 | 00:00:40 |

FIG. 6

| UTTERANCE ID | CHARACTER STRING |
|---|---|
| 1 | MAZUWA WATASHIKARA SETUMEISHIMASU. |
| 2 | YOROSHIKU ONEGAISHIMASU. |
| 3 | WATASHIWA SANSEIDESU. |
| 4 | WATASHIMO SOUOMOIMASU. |
| 5 | BOKUWA SONOIKENNIWA HANTAIDA. |
| 6 | BOKUGA IMAMADE KANGAETEKITAKOTOWA KOUDA. |

FIG. 7

| SPEAKER ID | UTTERANCE ID | CHARACTER STRING | CANDIDATE OF LINGUISTIC FEATURE | |
|---|---|---|---|---|
| | | | THE FIRST PERSON RULE ID MATCHED | THE END OF SENTENCE RULE ID MATCHED |
| 1 | 1 | MAZUWA WATASHIKARA SETUMEISHIMASU. | 1 | 1 |
| 1 | 3 | WATASHIWA SANSEIDESU. | 1 | 1 |
| 1 | 5 | BOKUWA SONOIKENNNIWA HANTAIDA. | 2 | 2 |

| SPEAKER ID | UTTERANCE ID | CHARACTER STRING | CANDIDATE OF LINGUISTIC FEATURE | |
|---|---|---|---|---|
| | | | THE FIRST PERSON RULE ID MATCHED | THE END OF SENTENCE RULE ID MATCHED |
| 1 | 1 | MAZUWA WATASHIKARA SETUMEISHIMASU. | 1 | 1 |
| 2 | 2 | YOROSHIKU ONEGAISHIMASU. | non | 1 |
| 1 | 3 | WATASHIWA SANSEIDESU. | 1 | 1 |
| 2 | 4 | WATASHIMO SOUOMOIMASU. | 1 | 1 |
| 1 | 5 | BOKUWA SONOIKENNNIWA HANTAIDA. | 2 | 2 |
| 3 | 6 | BOKUGA IMAMADE KANGAETEKITAKOTOWA KOUDA. | 2 | 2 |

| SPEAKER ID | THE NUMBER OF UTTERANCES | THE NUMBER OF UTTERANCES MATCHED WITH THE FIRST PERSON RULE | | | THE NUMBER OF UTTERANCES MATCHED WITH THE END OF SENTENCE RULE | | |
|---|---|---|---|---|---|---|---|
| | | ID1 | ID2 | ID3 | ID1 | ID2 | ID3 |
| 1 | 3 | 2 | 1 | 0 | 2 | 1 | 0 |
| 2 | 2 | 1 | 0 | 0 | 2 | 0 | 0 |
| 3 | 1 | 0 | 1 | 0 | 0 | 1 | 0 |

FIG. 10

| SPEAKER ID | LINGUISTIC FEATURE ||
|---|---|---|
| | THE FIRST PERSON RULE ID | THE END OF SENTENCE RULE ID |
| 1 | 1 | 1 |
| 2 | 1 | 1 |
| 3 | 2 | 2 |

APPARATUS AND METHOD FOR CLUSTERING SPEAKERS, AND A NON-TRANSITORY COMPUTER READABLE MEDIUM THEREOF

CROSS-REFERENCE TO RELATED APPLICATION

This application is based upon and claims the benefit of priority from Japanese Patent Application No. 2011-166071, filed on Jul. 28, 2011; the entire contents of which are incorporated herein by reference.

FIELD

Embodiments described herein relate generally to an apparatus and a method for clustering speakers, and a non-transitory computer readable medium thereof.

BACKGROUND

In order to support writing of the minutes of a meeting, it is required that utterances included in speech recorded at the meeting are clustered into each speaker. Many techniques to cluster utterances into each speaker by using an acoustic feature extracted from speech at the meeting are already reported. For example, a similarity between an acoustic feature of each utterance and many speaker models previously trained is calculated, and each utterance is clustered into each speaker based on a pattern of the similarity.

However, in above-mentioned method using acoustic feature only, if quality of speech at the meeting drops such as a background noise being included, each utterance cannot be correctly clustered.

BRIEF DESCRIPTION OF THE DRAWINGS

FIGS. 3A and 3B are examples of linguistic feature rules.

FIG. 5 is one example of segmentation result of utterances according to the first embodiment.

FIG. 6 is one example of clustering result of each utterance according to the first embodiment.

FIG. 7 is one example of character strings of each utterance according to the first embodiment.

FIG. 8 is one example of linguistic feature candidates of one speaker according to the first embodiment.

FIG. 9 is one example of linguistic feature rule matched with each utterance according to the first embodiment.

FIG. 10 is one example of the number of utterances matched with each linguistic feature rule according to the first embodiment.

FIG. 11 is one example of linguistic feature of each speaker according to the first embodiment.

DETAILED DESCRIPTION

Figure 1:
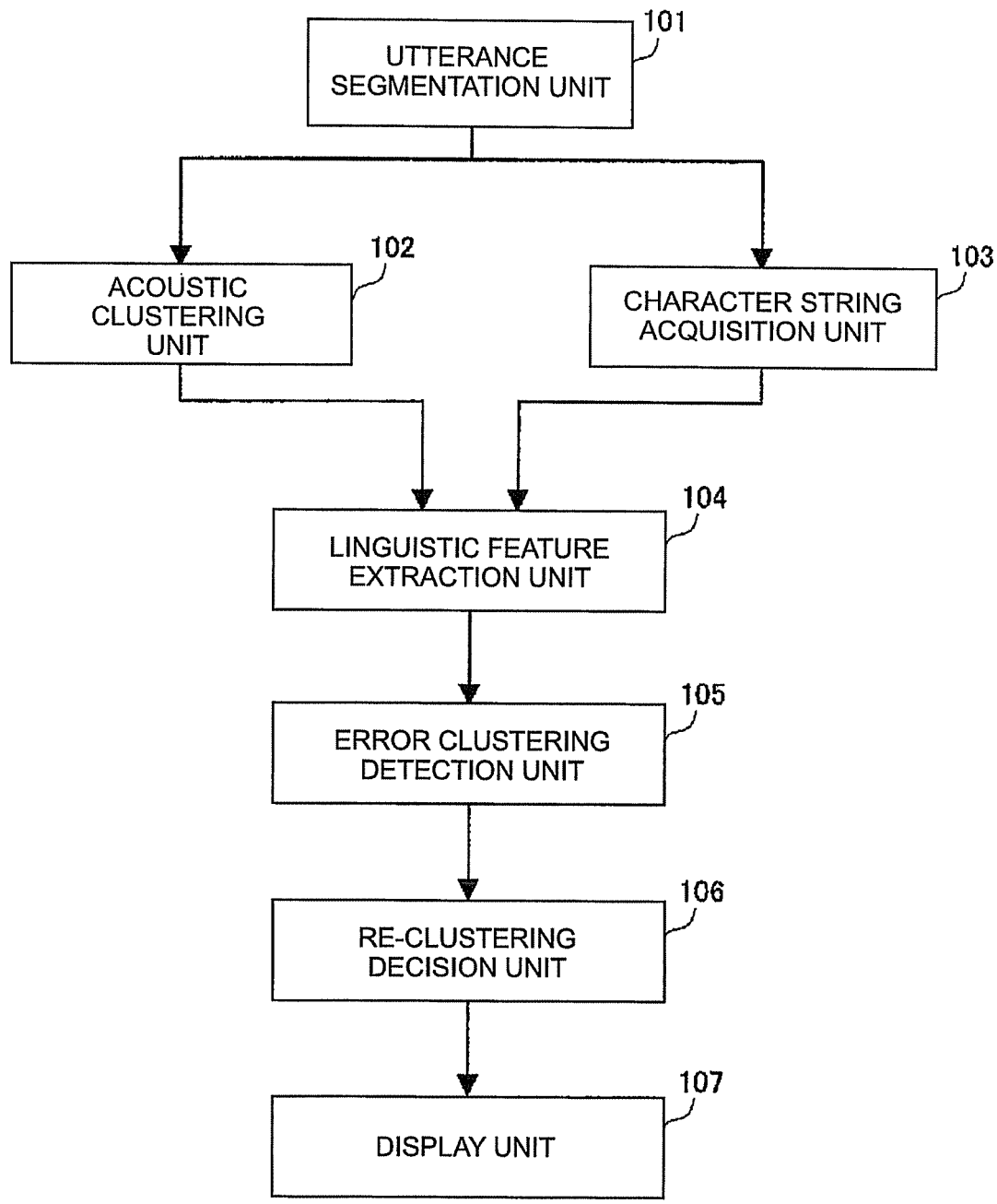
FIG. 1 is a block diagram of a speaker clustering apparatus according to the first embodiment.

According to one embodiment, a speaker clustering apparatus includes a clustering unit, an extraction unit, and an error detection unit. The clustering unit is configured to extract acoustic features for speakers from an acoustic signal, and to cluster utterances included in the acoustic signal into the speakers by using the acoustic features. The extraction unit is configured to acquire character strings representing contents of the utterances, and to extract linguistic features of the speakers by using the character strings. The error detection unit is configured to decide that, when one of the character strings does not fit with a linguistic feature of a speaker into which an utterance of the one is clustered, the utterance is erroneously clustered by the clustering unit.

Various embodiments will be described hereinafter with reference to the accompanying drawings.

(The First Embodiment)

As to a speaker clustering apparatus of the first embodiment, utterances in acoustic signal recorded at a meeting are clustered into each speaker. By clustering utterances into each speaker, a writer (user) of the minutes can selectively hear an utterance of the user's desired speaker among acoustic signals recorded. As a result, the user can confirm consistency of contents of utterances by the same speaker, and confirm flow of conversation among all speakers. Briefly, the user can smoothly prosecute writing of the minutes.

In the speaker clustering apparatus, first, utterances included in input acoustic signal are clustered into each speaker by using acoustic feature (For example, MFCC) extracted from the acoustic signal, and the clustering result is acquired. Next, by recognizing the acoustic signal of each utterance, a character string representing contents of each utterance is acquired. Then, a linguistic feature of each speaker included in the clustering result is extracted. As the linguistic feature, the character string representing the first person (used by each speaker) is utilized. In this case, from the character string of each utterance clustered into some speaker (For example, speaker ID1), an expression of the first person (such as "WATASHIHA", "BOKUHA") is extracted. Then, by counting a frequency of each expression of the first person, an expression of the first person having the frequency above a predetermined threshold is set to a linguistic feature of the speaker ID1.

Next, in the speaker clustering apparatus, it is decided whether the character string of each utterance matches (fits) with the linguistic feature of the speaker into which the utterance is clustered. As to an utterance not matched, it is decided to be erroneously clustered by using acoustic feature. For example, if a character string of an utterance is "BOKUHA" and a linguistic feature related to the first person of a speaker into which the utterance is clustered is "WATASHIHA", the linguistic feature thereof do not match. Accordingly, this utterance is decided to be erroneously clustered by the acoustic feature.

Furthermore, in the speaker clustering apparatus, as to the character string of the utterance decided to be erroneously clustered, it is decided whether to match (fit) with a linguistic feature of another speaker. If the character string of the utterance matches with the linguistic feature of another speaker, this utterance is clustered into the another speaker.

In this way, in the speaker clustering apparatus of the first embodiment, by using the linguistic feature, an utterance erroneously clustered by acoustic feature is decided. Furthermore, by using the linguistic feature, a speaker to originally cluster the utterance erroneously clustered is decided. As a result, as to an utterance (such as a background noise being included) difficult to be clustered by acoustic feature only, it can be correctly clustered into a speaker by using linguistic feature.

(Block Component)

FIG. 1 is a block diagram of the speaker clustering apparatus according to the first embodiment. The speaker clustering apparatus includes an utterance segmentation unit 101, an acoustic clustering unit 102, a character string acquisition unit 103, a linguistic feature extraction unit 104, an error clustering detection unit 105, a re-clustering decision unit 106, and a display unit 107.

The utterance segmentation unit 101 segments an input acoustic signal into each utterance. The acoustic clustering unit 102 clusters, each utterance (segmented by using acoustic feature) into each speaker, and acquires a clustering result. The character string acquisition unit 103 acquires a character string representing contents of each utterance by using speech-recognition. The linguistic feature extraction unit 104 acquires the character string of utterances clustered into each speaker (included in the clustering result), and extracts a linguistic feature of each speaker by using the character string. The error clustering detection unit 105 decides whether each utterance matches (fits) with the linguistic feature of a speaker into which the utterance is clustered (in the clustering unit), and, if the utterance does not match, decides that the utterance is erroneously clustered into the speaker by the acoustic clustering unit 102. The re-clustering decision unit 106 decides whether the character string of the utterance (decided to be erroneously clustered) matches with a linguistic feature of another speaker, and, if the utterance matches, decides that the utterance is clustered into the another speaker. The display unit 107 suitably displays the clustering result (by the speaker clustering apparatus) to a user.

(Hardware Component)

Figure 2:
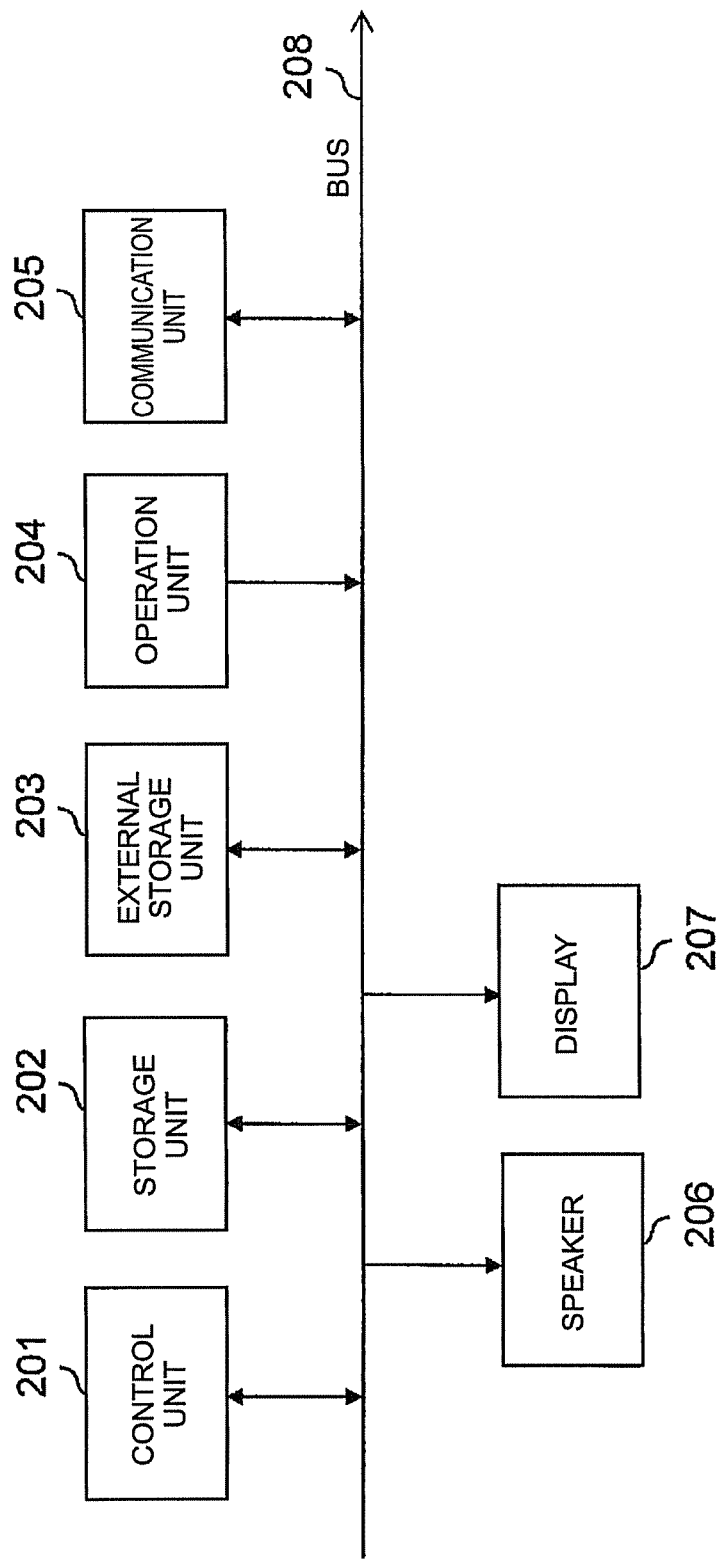
FIG. 2 is a hardware component of the speaker clustering apparatus of FIG. 1.

The speaker clustering apparatus of the first embodiment is composed by a hardware utilizing a regular computer shown in FIG. 2. The speaker clustering apparatus includes a control unit 201 such as CPU (Central Processing Unit) to control all the apparatus, a storage unit 202 such as ROM (Read Only Memory) and RAM (Random Access Memory) to store various data and programs, an external storage unit 203 such as HDD (Hard Disk Drive) and CD (Compact Disk) to store various data and programs, an operation unit 204 such as a keyboard and a mouse to accept an indication input from a user, a communication unit 205 to control communication with an external device, a speaker to generate a sound by reproducing a speech waveform, a display 207 to display a video, and a bus to connect these units.

In this hardware component, by executing various programs stored in the storage unit 202 (such as ROM) and the external storage unit 203 by the control unit 201, following functions are realized.

(Function of Each Unit)

The utterance segmentation unit 101 segments an input acoustic signal into each utterance. In order to segment into each utterance, technique for detecting voice segment by using energy or spectrum feature is used. The acoustic signal (as an object to create the minutes) is acquired from the external storage unit 203 (such as HDD) or another terminal (not shown in Fig.) connected to a network via the communication unit 205. The utterance segmentation unit 101 acquires "utterance ID, start time, completion time" of each utterance. Here, the utterance ID is a serial number assigned to each utterance, which is assigned from the start number such as 1, 2, 3 . . . . The start time and the completion time represent that a start position and an end position of each utterance respectively correspond to which time in the acoustic signal. For example, the result such as "3, 00:00:18, 00:00:25" means that the third (ID3) utterance is included in a segment from 18 seconds to 25 seconds of the acoustic signal.

The acoustic clustering unit 102 clusters utterances (segmented) into each speaker by using an acoustic feature extracted from the acoustic signal. As the acoustic feature, MFCC is used. As disclosed in JP-A 2010-60850 (Kokai), by previously storing many speaker models into the external storage unit 203 such as HDD, a similarity between MFCC (extracted from each utterance) and each speaker model is calculated, and each utterance is clustered into each speaker. As to each utterance, the acoustic clustering unit 102 outputs "speaker ID, utterance ID, start time, completion time" as a clustering result. The speaker ID is an identifier to identify the speaker, which represents each utterance is clustered into any speaker. As the utterance ID, the start time and the completion time, a segmentation result from the utterance segmentation unit 101 is used.

The character string acquisition unit 103 acquires a character string representing contents of each utterance by using speech-recognition. As the speech-recognition, an acoustic feature such as MFCC is used. An acoustic model/linguistic model used for matching with MFCC is previously stored into the external storage unit 203 such as HDD. As to each utterance, the character string acquisition unit 103 outputs "utterance ID, character string". Here, the character string represents a recognition result of each utterance ID.

As to each speaker included in the clustering result from the acoustic clustering unit 102, the linguistic feature extraction unit 104 acquires a character string representing contents of the utterance, and extracts a linguistic feature of each speaker by using the character string. Concretely, as to an utterance clustered into some speaker, it is decided whether a linguistic feature rule (previously determined) matches with a character string of the utterance. The linguistic feature rule can be created by extracting a specific expression (such as the first person) from morphological analysis result of the past minutes data or contents of a general dictionary. Besides this, the linguistic feature rule may be manually created. In the first embodiment, "matching" means coincidence of character strings.

In the first embodiment, as the linguistic feature rule, two kinds of rules, i.e., "the first person rule" and "the end of sentence rule", are used. FIGS. 3A and 3B show the linguistic feature rule. For example, if a character string of an utterance clustered into some speaker ID is "WATASHIMO SOUOMOIMASU.", by matching with character strings of the linguistic feature rule, the character of the utterance matches with character strings of the first person rule ID1 and the end of sentence rule ID1. Above-mentioned processing is executed for other utterances clustered into the same speaker ID. Then, as to each speaker, the number of utterances matched with the same linguistic rule (the first person rule or the end of sentence rule) is counted. If the number of utterances is larger than a predetermined threshold, this linguistic feature rule is set to a linguistic feature of the speaker. Concrete processing is explained by referring a flow chart (explained afterwards). Moreover, the linguistic feature rule is stored into the external storage unit 203 such as HDD.

The error clustering detection unit 105 decides whether the character string of each utterance matches with the linguistic feature of the speaker into which the utterance is clustered in the clustering result of the acoustic clustering unit 102. If the character string does not match, this utterance is decided to be erroneously clustered by the acoustic clustering unit 102. For example, assume that a character of an utterance clustered into some speaker ID is "WATASHIMO SOUOMOIMASU.", and a linguistic feature related to the first person rule of this speaker ID is the first person rule ID2 (BOKU) in FIG. 3A. This character string of the utterance does not match with a character string of the first person rule ID2. Accordingly, this utterance is decided to be erroneously clustered by the acoustic clustering unit 102. This concrete processing is explained by a following flow chart.

The re-clustering decision unit 106 decides whether an utterance decided as error clustering (by the error clustering detection unit 105) is clustered into another speaker ID. Concretely, it is decided whether a character string of an utterance decided as error clustering matches with a linguistic feature of another speaker ID. If the character string of the utterance matches with the linguistic feature of another speaker ID, this speaker ID is output as a candidate of correct clustering. For example, if the character string of the utterance decided as error clustering is "WATASHIMO SOUOMOIMASU.", a speaker having the first person rule ID1 and the end of sentence rule ID1 (in FIGS. 3A and 3B) as the linguistic feature is set to a candidate of correct clustering.

The display 107 suitably presents a processing result (by the speaker clustering apparatus) to a user via the display 207.

(Flow chart)

Figure 4:
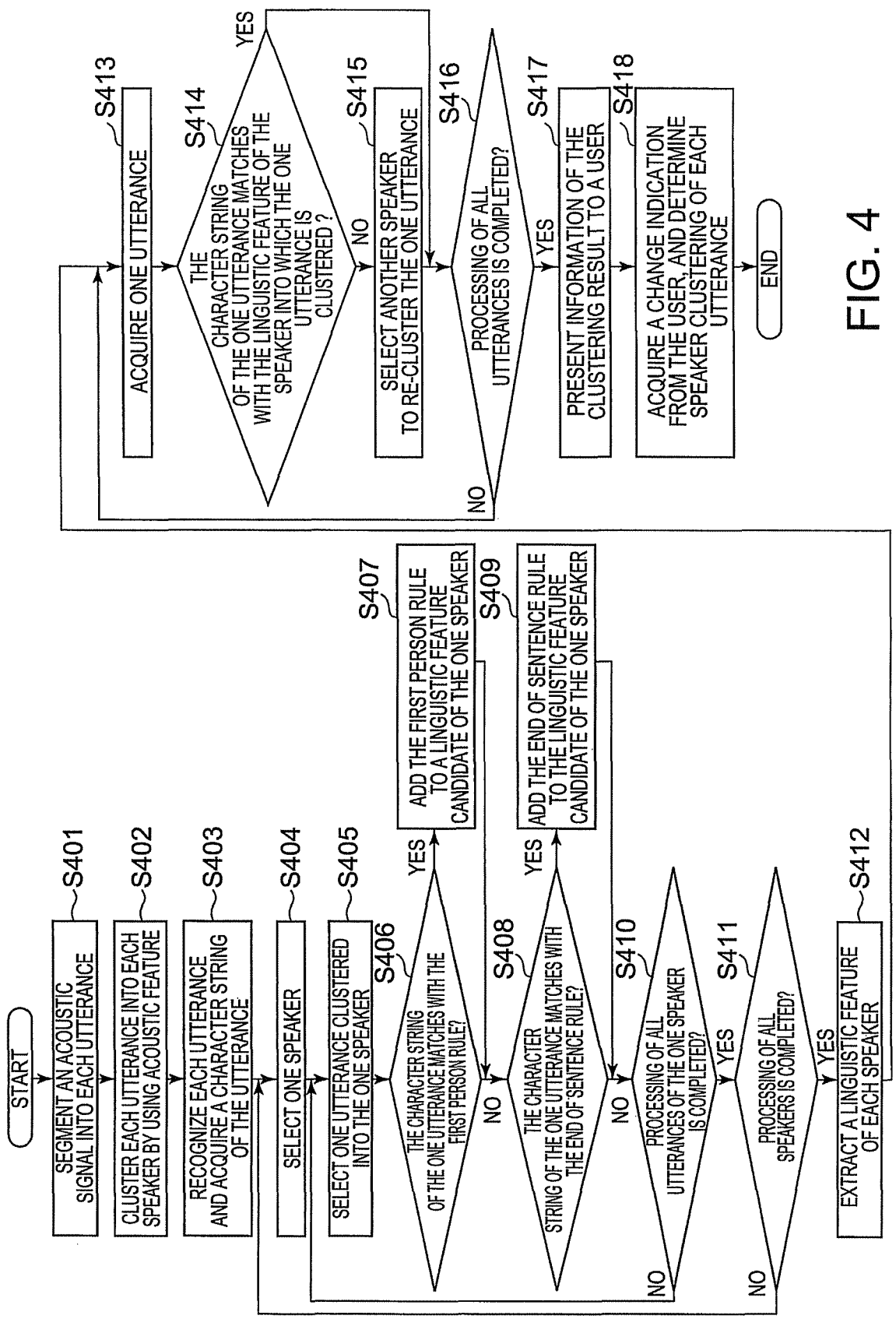
FIG. 4 is a flow chart of processing of the speaker clustering apparatus of FIG. 1.

FIG. 4 is a flow chart of operation of the speaker clustering apparatus according to the first embodiment.

At S401, the utterance segmentation unit 101 segments an input acoustic signal into each utterance. FIG. 5 shows a segmentation result by the utterance segmentation unit 101.

At S402, the acoustic clustering unit 102 clusters each utterance (segmented at S401) into each speaker by using an acoustic feature. FIG. 6 shows a clustering result by the acoustic clustering unit 102.

At S403, the character string acquisition unit 103 recognizes an acoustic signal of each utterance (segmented) and acquires a character string representing contents of the utterance. FIG. 7 shows the character string of each utterance acquired by the character string acquisition unit 103.

At S404, the linguistic feature extraction unit 104 selects one speaker to extract a linguistic feature thereof. Here, the linguistic feature is extracted in order of speaker ID1, speaker ID2, . . . .

At 405, the linguistic feature extraction unit 104 acquires utterances clustered into the speaker selected at S404, in order of smaller value of the utterance ID. In FIG. 6, utterances clustered into the speaker ID1 are utterances IDs 1, 3, 5. Here, first, an utterance of the utterance ID1 is acquired.

At S406, the linguistic feature extraction unit 104 decides whether a character string of utterance acquired at S405 matches with the first person rule previously stored. If the character string matches, processing step is forwarded to S407. If the character string does not match, processing step is forwarded to S408. In FIG. 7, a character string of the utterance ID1 is "MAZUWA WATASHIKARA SETSUMEISHIMASU.". This character string includes the first person "WATASHI". Accordingly, by comparing the character string with the first person of FIG. 3A, the first person rule ID1 is matched.

At S407, the linguistic feature extraction unit 104 stores the first person rule ID matched at S406, as a candidate of linguistic feature of the speaker into which the selected utterance is clustered. FIG. 8 shows the first person rule stored for utterances of the utterance IDs 1, 3, 5.

At S408, the linguistic feature extraction unit 104 decides whether the character string of utterance acquired at S405 matches with the end of sentence rule previously stored. If the character string matches, processing step is forwarded to S409. If the character string does not match, processing step is forwarded to S410. The character string of the utterance ID1 includes the end of sentence "MASU". Accordingly, the end of sentence rule ID1 of FIG. 3B is matched.

At S409, the linguistic feature extraction unit 104 stores the end of sentence rule ID matched at S408, as a candidate of linguistic feature of the speaker into which the selected utterance is clustered. FIG. 8 shows the end of sentence rule stored for utterances of the utterance IDs 1, 3, 5.

At S410, the linguistic feature extraction unit 104 decides whether processing is already completed for all utterances clustered into the speaker selected at S404. If the processing is not completed for at least one utterance, processing step is forwarded to S405, and the processing is executed for the at least one utterance. If the processing is already completed, the processing step is forwarded to S411.

At S411, the linguistic feature extraction unit 104 decides whether processing is already completed for all speakers. If the processing is not completed for at least one speaker, processing step is forwarded to S404, and the processing is executed for the at least one speaker. If the processing is already completed, the processing step is forwarded to S412.

At S412, the linguistic feature extraction unit 104 extracts a linguistic feature of each speaker. Concretely, from the first person rule and the end of sentence rule stored at S407 and S409, a linguistic feature of the speaker is finally determined. FIG. 9 shows the first person rule and the end of sentence rule stored as a candidate of linguistic feature.

First, from candidates of linguistic feature of FIG. 9, as shown in FIG. 10, the linguistic feature extraction unit 104 respectively counts the number of utterances matched with the first person rule and the number of utterances matched with the end of person rule for each speaker ID. In FIG. 10, "the number of utterances" represents a total of utterances clustered into each speaker ID, "the number of utterances matched with the first person rule" and "the number of utterances matched with the end of sentence rule" represent the number of utterances matched with each rule.

Next, the first person rule or the end of sentence rule of which the number of utterances matched is larger than a predetermined threshold is extracted as a linguistic feature of the speaker. Here, as to the same speaker ID, if the number of utterances matched with a specific rule ID is the largest in the same rule (For example, the first person rule ID1~ID3) and if a normalized value of the number of utterances by the number of utterances of the speaker ID is larger than 0.5, the specific rule ID is selected as a linguistic feature of the speaker ID. For example, as to the first person rule of the speaker ID1, the first person rule ID1 has the largest number of utterances "2" matched therewith, and a normalized value "⅔" of the largest number of utterances "2" by the number of utterances "3" of the speaker ID1 is larger than a threshold "0.5". Accordingly, as a linguistic feature of the speaker ID1, the first person rule ID1 is selected. As to the end of sentence rule, the same processing is applied. By executing above-mentioned processing for all speaker IDs, the linguistic feature of all speakers is extracted as shown in FIG. 11.

Next, in the speaker clustering apparatus of the first embodiment, by using the linguistic feature extracted at S412, an utterance erroneously clustered by acoustic feature thereof is decided.

At S413, the error clustering detection unit 105 selects one utterance. Here, each utterance is selected in order of smaller value of utterance ID thereof.

At S414, the error clustering unit 105 decides whether a character string of the selected utterance matches with a linguistic feature of the speaker ID into which the selected utterance is clustered. If the character string matches, processing step is forwarded to S416. If the character string does not match, processing step is forwarded to S415. For example, in FIG. 9, the utterance ID5 is clustered into the speaker ID1. However, by comparing a character string "BOKUWA SONOIKENNIWA HANTAIDA" of the utterance ID5 with a linguistic feature (the first person rule ID1, the end of sentence rule ID1) of the speaker ID1 of FIG. 11, the character string does not match the linguistic feature. Accordingly, the utterance ID5 is decided as an utterance erroneously clustered using acoustic feature by the acoustic clustering unit 102. Moreover, in the first embodiment, if the character string of an utterance does not match both the first person rule and the end of sentence rule, the utterance is decided to be erroneously clustered. Besides this, if the character string of an utterance does not match one of the first person rule and the end of sentence rule, the utterance may be decided to be erroneously clustered.

At S415, the re-clustering decision unit 106 decides a speaker ID to originally cluster the utterance decided to be erroneously clustered at S414, by using a linguistic feature. Concretely, it is decided whether a character string of this utterance matches with a linguistic feature of another speaker except for the speaker clustered by the acoustic clustering unit 102. If the character string matches, this utterance is decided as an utterance to be clustered into the another speaker. As to a character string "BOKUWA SONOIKENNIWA HANTAIDA." of the utterance ID5, the first person is "BOKUHA" and the end of sentence is "DA.". By comparing this character string with linguistic features of other speakers (speaker ID2 and speaker ID3), this character string of the utterance ID5 matches with a linguistic feature (the first person rule ID2 and the end of sentence rule ID2) of the speaker ID3. Accordingly, the utterance ID5 is decided as an utterance to be clustered into the speaker ID3. Moreover, in the first embodiment, if the character string of an utterance matches with both the first person rule and the end of sentence rule, the utterance is re-clustered. However, if the character string of an utterance matches with one of the first person rule and the end of sentence rule, the utterance may be re-clustered.

As mentioned-above, in the speaker clustering apparatus of the first embodiment, by using a linguistic feature, an utterance erroneously clustered using acoustic feature is decided. Furthermore, by using the linguistic feature, a speaker to originally cluster the utterance erroneously clustered using acoustic feature is decided. As a result, as to an utterance (such as a background noise being included) difficult to be clustered using acoustic feature only, the utterance can be correctly clustered into a speaker by using the linguistic feature.

Moreover, at S414 and S415, a character string of the utterance is compared with a character string of linguistic feature. However, by using the first person rule and the end of sentence rule (extracted at S407, S409) matched with each utterance (FIG. 9), matching with the linguistic feature of each speaker may be decided.

At S416, it is decided whether processing is completed for all utterances. If the processing is completed, processing step is forwarded to S417. If the processing is not completed for at least one utterance, processing step is forwarded to S413.

Figure 12:
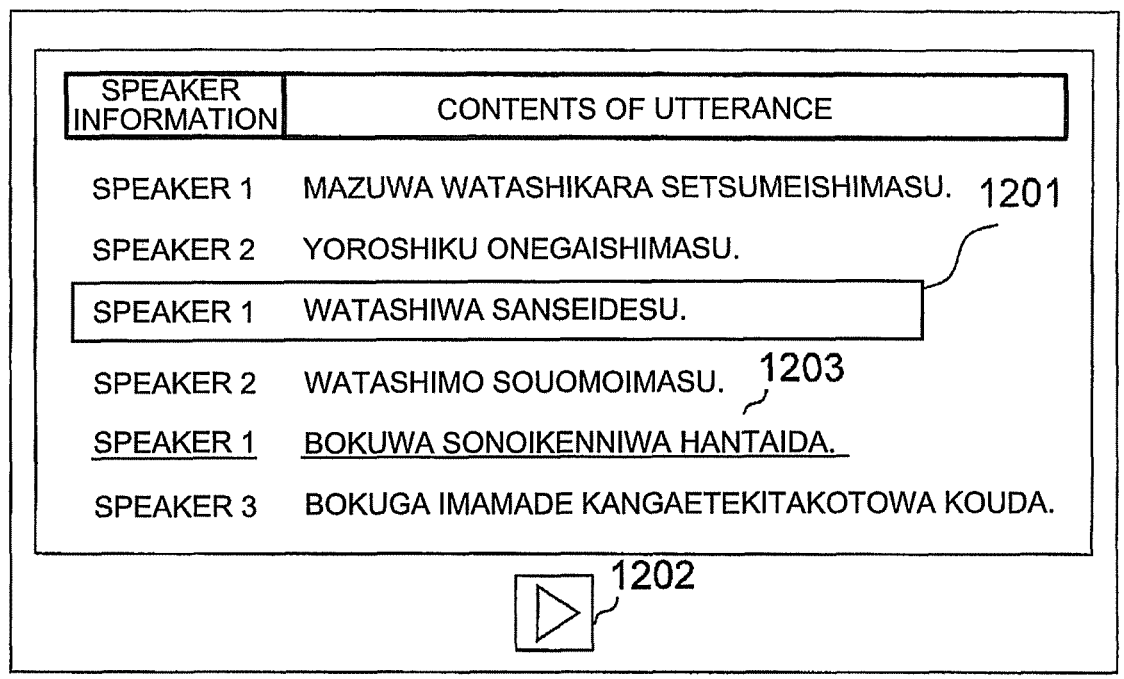
FIG. 12 is one example of information of clustering result presented to a user according to the first embodiment.

At S417, the display unit 107 presents a clustering result (by the acoustic clustering unit 102) and a re-clustering result (by the re-clustering decision unit 106) to a user via the display 207. FIG. 12 is one example of a screen displayed on the display 207. In FIG. 12, a clustering result by the acoustic clustering unit 102 is shown. In this example, "SPEAKER INFORMATION" represents a speaker ID, and "SPEAKER ID1" is displayed as "SPEAKER 1". Furthermore, "CONTENTS OF UTTERANCE" represents a character of each utterance acquired by speech-recognition. In FIG. 12, "1201" represents a cursor, and a focus thereof is changed by the operation unit 204 such as a keyboard or a mouse. Furthermore, "1202" represents a replay button, and, by pushing this button, an utterance focused by the cursor 1201 is replayed from the speaker 206. As a result, a user can manually correct an error of speech-recognition by hearing the utterance.

Furthermore, as shown in FIG. 12, speaker information (speaker ID) is added to each utterance. Accordingly, the user can selectively hear an utterance of the user's desired speaker from acoustic signals recorded. As a result, the user can confirm consistency of contents of utterance by the same speaker, and confirm flow of conversation among speakers. Briefly, the user can smoothly prosecute writing of the minutes of the meeting.

In FIG. 12, an utterance 1203 having a character string underlined is an utterance decided to be erroneously clustered by the error cluster detection unit 105. When the user selects this utterance and desirably operates via the operation unit 204, as shown in 1204 of FIG. 13, a re-clustering result by the re-clustering decision unit 106 is displayed as a drop-down list. In this example, by the re-clustering decision unit 106 at S415, the utterance ID5 is re-clustered into the speaker ID3. Accordingly, "SPEAKER 3" is displayed as a candidate. After the user has heard a speech of the utterance by pushing the replay button 1202, the user can finally indicate whether this utterance is clustered into the speaker 1 or the speaker 3 to the speaker clustering apparatus via the operation unit 204.

Figure 13:
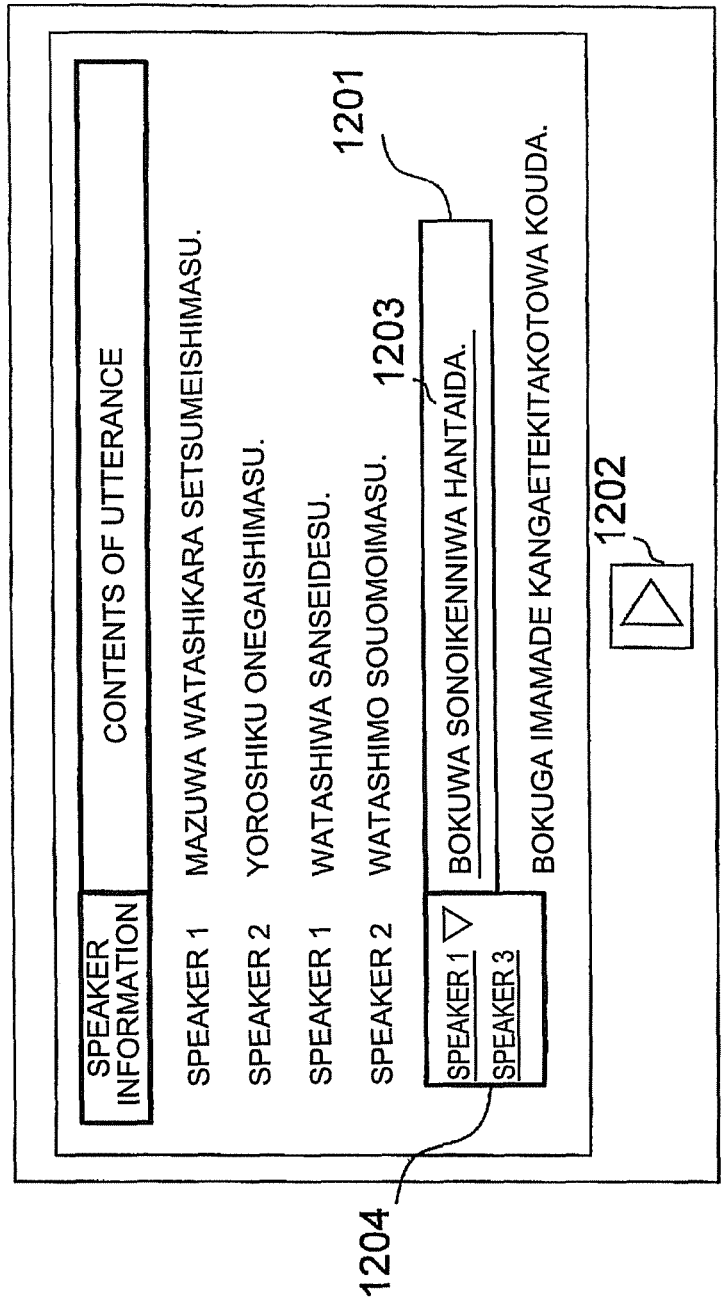
FIG. 13 is one example of information of clustering result for a user to correct the speaker according to the first embodiment.

Last, at S418, the user's indication at S417 is acquired, and the speaker clustering result is finally determined. In FIG. 13, when the user changes a speaker of the utterance ID5 to the speaker 3, the speaker clustering apparatus determines that a speaker of the utterance ID5 is the speaker ID3. The speaker clustering result determined is stored into the external storage unit 203 such as HDD.

(Effect)

In this way, in the speaker clustering apparatus of the first embodiment, by using the linguistic feature, an utterance erroneously clustered using acoustic feature is decided. Furthermore, by using the linguistic feature, a speaker to originally cluster the utterance erroneously clustered using acoustic feature is decided. As a result, as to an utterance (such as a background noise being included) difficult to be clustered using acoustic feature only, the utterance can be correctly clustered into a speaker by using the linguistic feature.

Furthermore, in the speaker clustering apparatus of the first embodiment, a character string representing contents of the utterance is acquired, and a linguistic feature of each speaker is extracted by using this character string. As a result, the linguistic feature of each speaker need not be previously registered.

(Modification 1)

In the first embodiment, a clustering result acquired at S415 is presented to a user, and the user finally selects a speaker to cluster an utterance. However, a clustering result acquired by the re-clustering decision unit 106 may be determined as the final clustering result.

Furthermore, in the first embodiment, a character string of an utterance is acquired by speech-recognition. However, a character string manually assigned by the user may be utilized as the character string of the utterance. As a result, error caused by speech-recognition can be avoided, and the linguistic feature of each speaker cam be more correctly extracted. In this case, the speaker cluster apparatus of the first embodiment can be applied to speaker-indexing to cluster the acoustic signal into each speaker.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for clustering speakers, the apparatus comprising:
    a memory device that stores an acoustic signal already recorded;
    a clustering unit executed by a computer using a stored program, configured to extract acoustic features for speakers from the acoustic signal, and to cluster utterances included in the acoustic signal into each of the speakers by using the acoustic features;
    an acquisition unit executed by the computer, configured to acquire character strings by recognizing the acoustic signal of each utterance;
    an extraction unit executed by the computer, configured to acquire the character strings representing contents of the utterances, and to extract a linguistic feature of each of the speakers by comparing the character strings with a first person rule and an end of sentence rule;
    an error detection unit executed by the computer, configured to decide that, when one of the character strings does not fit with the linguistic feature of a speaker into which an utterance of the one is clustered, the utterance is erroneously clustered by the clustering unit; and
    a display that displays at least one of a clustering result of the clustering unit and a decision result of the error detection unit.

2. The apparatus according to claim 1, further comprising:
    a re-clustering unit executed by the computer, configured to decide that, when one fits with the linguistic feature of another speaker, the utterance is to be clustered into the another speaker.

3. The apparatus according to claim 1, wherein
    the extraction unit decides whether the first person rule and the end of sentence rule previously-stored fit with the character strings of the utterances clustered into each of the speakers, and sets the rule of which the number of utterances of fitted character strings is larger than a predetermined threshold, as the linguistic feature of the speaker into which the utterances of fitted character strings are clustered.

4. The apparatus according to claim 2, wherein
    the display displays a decision result of the re-clustering unit.

5. A method for clustering speakers, the method being realized by executing a stored program by a computer, the comprising:
    storing by the computer into a memory device, acoustic signal already recorded;
    extracting, by the computer, acoustic features for speakers from the acoustic signal;
    clustering, by the computer, utterances included in the acoustic signal into each of the speakers by using the acoustic features;
    acquiring, by the computer, character strings by recognizing the acoustic signal of each utterance;
    acquiring, by the computer, the character strings representing contents of the utterances;
    extracting, by the computer, a linguistic feature of each of the speakers by comparing the character strings with a first person rule and an end of sentence rule;
    deciding, by the computer, that, when one of the character strings does not fit with the linguistic feature of a speaker into which an utterance of the one is clustered, the utterance is erroneously clustered by the clustering; and
    displaying by the computer via a display, at least one of a clustering result of the clustering and a decision result of the deciding.

6. A non-transitory computer readable medium for causing a computer to perform a method for clustering speakers, the method comprising:
    storing, by the computer into a memory device, acoustic signal already recorded;
    extracting acoustic features for speakers from an acoustic signal;
    clustering utterances included in the acoustic signal into each of the speakers by using the acoustic features;
    acquiring character strings by recognizing the acoustic signal of each utterance;
    acquiring the character strings representing contents of the utterances;
    extracting a linguistic feature of each of the speakers by comparing the character strings with a first person rule and an end of sentence rule;
    deciding that, when one of the character strings does not fit with the linguistic feature of a speaker into which an utterance of the one is clustered, the utterance is erroneously clustered by the clustering; and
    displaying by the computer via a display, at least one of a clustering result of the clustering and a decision result of the deciding.

* * * * *